United States Patent [19]

De Longcamp

[11] Patent Number: 4,917,162

[45] Date of Patent: Apr. 17, 1990

[54] DEFORMABLE WHEEL USEFUL FOR INSTANCE AS A VEHICLE WHEEL OR IN A GEARING

[76] Inventor: Guy Le Feron De Longcamp, 9 Rue Massenet 75016, Paris, France

[21] Appl. No.: 195,714

[22] Filed: May 18, 1988

Related U.S. Application Data

[63] Continuation of Ser. No. 825,327, Mar. 24, 1986, abandoned, which is a continuation-in-part of Ser. No. 455,939, Jan. 6, 1983, abandoned, which is a continuation-in-part of Ser. No. 171,838, Jul. 24, 1980, abandoned.

[30] Foreign Application Priority Data

Jul. 25, 1979 [FR] France .................................. 79 19137

[51] Int. Cl.$^4$ ................................................ B60C 7/00
[52] U.S. Cl. ........................................ 152/5; 301/55
[58] Field of Search ................... 152/5, 6, 11, 12, 14; 301/55

[56] References Cited

U.S. PATENT DOCUMENTS

| | | | |
|---|---|---|---|
| 398,403 | 2/1889 | James | 152/12 |
| 856,100 | 6/1907 | Perruchon | 152/12 |
| 865,143 | 9/1907 | Williams | 152/12 X |
| 1,298,660 | 4/1919 | Cardoso | 152/5 |
| 1,338,105 | 4/1920 | Slocum | 152/12 |
| 2,404,974 | 7/1946 | Martin | 152/6 X |
| 3,088,775 | 5/1963 | Hawkes | 301/55 |
| 4,602,823 | 7/1986 | Berg | 301/55 X |

*Primary Examiner*—Russell D. Stormer
*Attorney, Agent, or Firm*—Howard C. Miskin

[57] ABSTRACT

A deformable wheel useful for example as a vehicle wheel or as a gear comprises a tread which is incompressible around its periphery but flexible under radial forces and a tension transmission system connecting different points of the tread to substantially diametrically opposed points and designed in such a way that, under a normal load, the strength of the radial forces which act on part of the connecting system is sufficient to prevent the wheel from collapsing completely. The tread may be constructed of hinged plates or may be similar to a tire tread or may be provided with teeth, depending on the application of the wheel, and the wheel may also include a central rigid part or hub to which the connecting system is attached. The wheel may be used for vehicles, gearings, pulleys and so on.

6 Claims, 5 Drawing Sheets

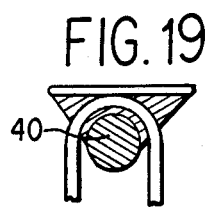
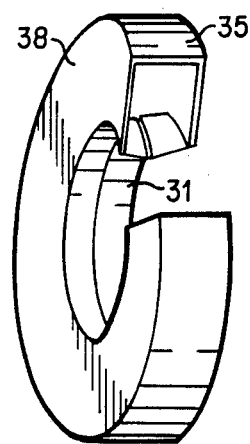
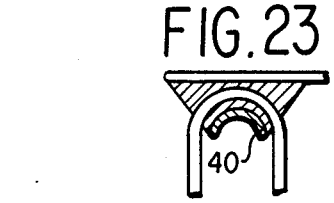
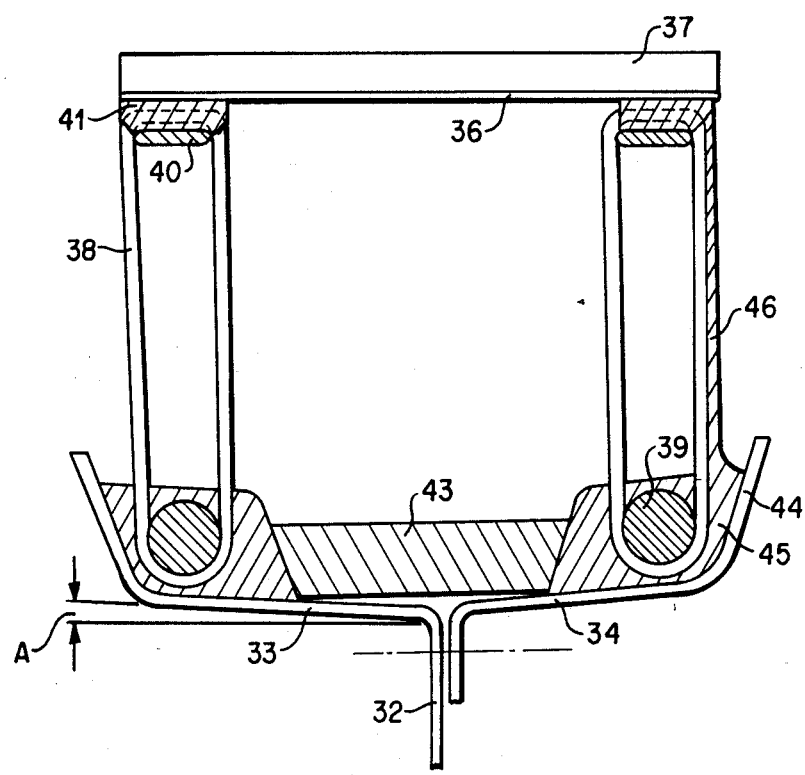

DEFORMABLE WHEEL USEFUL FOR INSTANCE AS A VEHICLE WHEEL OR IN A GEARING

The present application is a continuation of application Ser. No. 825,327 filed Mar. 24, 1986, which is a continuation-in-part of application Ser. No. 455,939 filed Jan. 6, 1983, which is a continuation-in-part of application Ser. No. 171,838 filed July 24, 1980. All are abandoned.

The present invention relates generally to improvements in deformable wheels to be used for instance as a vehicle wheel gear or the like.

Conventionally most automotive vehicle wheels are equipped with pneumatic tires, i.e. these assemblies which comprise a central part which is rigid around which is fitted a cover containing a gas under pressure. The cover comprises a tread which has a substantially cylindrical shape when it is not loaded, which, when loaded, is deformed in such a way as to produce a substantially flat area on the part of its circumference which is in contact with the ground (the word tread should be understood hereafter as the portion of the tire located at the top or outer periphery between the sidewalls). This tread is connected to the central part by two sidewalls, which have several functions: they help seal the gas-filled cover, they limit lateral deformations, they oppose centrifugal forces acting upon the tread and because of their rigidity they add to the deflection resistance. It is simple to establish that even when the inner pressure is zero, a vehicle wheel can support a load greater than its own weight, but less than the normal load, without completely collapsing.

In a very few cases, such as in a baby carriage, the sidewall resistance may be such that no inner pressure is required, but this application provides a riding comfort which is only slightly better than that of a solid tire and can only support a very small load. However, in most cases the pressure inside a pneumatic tire is high and is increased with an increase in the load. As a result the danger of bursting is increased, and especially in the case of aeronautic applications the wheel assembly is a potential cause of accidents, a hazard which must be given more and more consideration.

Numerous and various improvements in the standard pneumatic tire structure have been proposed in an effort to reduce the hazards resulting from a sudden drop in pressure. For example, French patent No. 1.376.590 proposes putting rigid, resilient rings into the tire tread. If a puncture occurs when the wheel is loaded, then the central part moves off center relative to the rings, and as result the load is supported by the resistance of the sidewalls to this eccentricity. Each of the sidewalls acts substantially as a plastic disc which has a substantially indeformable edge when the central part is submitted to forces pushing it toward of its circumference. But the disadvantage of this system is that since the tire tread is more rigid, the flat area in contact with the ground is reduced.

If one examines a vehicle wheel with a standard tire, a car wheel, or aircraft wheel for instance, it is obvious that the gas pressure plays predominant role in maintaining the normal shape of the wheel when the latter is operated under load. Actually the wheel stops operating normally even before the pressure has dropped to zero.

Two means have been proposed permitting the tire to operate under load even when there is no pressure. One of these is to reinforce the sidewalls so as to increase their rigidity in response to a movement of the tread towards the central part; when the pneumatic tire is deflated, the traction resistance of the sidewall in the upper part of the wheel, and the compression resistance of the sidewall in the lower part of the wheel act in the same direction, preventing the rim from coming in contact with the tread or with the ground.

This solution which is proposed in particular in French patents No: FR 434897 and FR 2.399.505 and which is very closely related to the solution for the wheel in baby carriages which is referred to above, has only a very limited application.

The other solution which is described in patents No. FR 1.376.590, U.S. Pat. No. 1,345,777, U.S. Pat. No. 1,428,726 and in the pending patent FR 2.425.953 which corresponds to Markow U.S. Pat. No. 4,111,249, is to increase the resistance which already exists in the tread itself, for instance with rings or strong and elastic sheet-metal reinforcement; of course the lower and upper parts of the sidewalls still transmit the load from the rim to the tread, but the difference between this solution and the first solution is as follows: if the existing resistance to the deformation of the tread is not increased as in the first solution, it will tend, under the effect of the traction that is applied to it at that part diametrically opposite the contact patch and the effect of the reaction of the ground, to assume on an oval form with a maximum elogation which is approximately in an horizontal direction, and thus the sidewalls are submitted to horizontal stresses. If on the contrary the tread is rigid there is less ovalization and there is practically no horizontal stress in the sidewalls. It has already been explained above that this second solution has the disadvantage of reducing the contact patch.

The above mentioned U.S. Pat. No. 4,111,249, suggests increasing the rigidity of the sidewalls proportionally to the increase of the tread stiffness, for better control in the guiding of the vehicle. This means that the designer has few possibilities of choice, between a wheel which is too supple and cannot support a heavy load, and a wheel which is too rigid, and uncomfortable. In the examples in this patent, the sidewalls are those of a conventional radial tire, since the tread is reinforced by a steel band.

Thus to the inventor's knowledge all the solutions consisted in increasing the rigidity of the sidewalls and/or the tread in order to enable the wheel to operate even when there is no inflation pressure.

For a long time, wheels of another type have been proposed, which can be designated as "resilient non-pneumatic wheels", as, for instance, C. E. U.S. Pat. No. 398,403 issued on Feb. 26, 1889. In such wheels, no inflation pressure is provided, and resilient means, such as spokes made of spring metal connect the central part to the tread. Those spokes, according to the James patent, are somewhat longer than the distance of the central part to the tread, so that they are curved or bent when they are in place. Such wheels function under two modes: under the normal mode, that is when the wheel carries the load it is calculated to support, the resilient means of the lower part of the wheel are compressed and the resilient means of the higher part of the wheel are submitted to tensile forces, whereby the central part, when the wheel is running, continuously oscillates in a vertical plane, from over to under a middle position. When the load is increased, or when the wheel encounters an obstruction, the resilient means come to a limit whereafter they are rectilinear and react to a further increase of the load with a modulus of elasticity which can be about 1,000 or 10,000 times higher. Therefore the wheel comes into a second mode of functioning, where its behaviour is very similar to that of a rigid wheel as regards to the ratio between a further load increase and the corresponding variation in the height of the central part. In the James patent, this limit corresponds to the fact that certain spokes straighten out. Obviously such a two-modes functioning is not satisfactory.

An object of the present invention is to provide a wheel having the same properties of flexibility and traction as is usually found in wheels with pneumatic tires, but without the disadvantage resulting from the presence of an inflation pressure.

Another object of the present invention is to provide a wheel which may be operated under a normal load without the necessity of any internal pressure but which, however, has a contact patch which is not less that of a standard pneumatic tire.

A wheel according to the present invention comprises a central part, a radially deformable tread whose periphery is substantially constant in length and means for connecting said central part to said tread, said means having a first radial dimension when the wheel is not loaded and has no internal pressure and a second radial dimension when the wheel is under the load it is intended to support and has no internal pressure and lies on flat ground, said second radial dimension being greater than said first radial dimension by no more than one tenth of said first radial dimension, and said means being substantially unable to generate an outwardly directed resilient force on a part of the tread in response to an inwardly directed displacement of said part of the tread from the position it has when said wheel is under said load it is intended to support.

A feature of this improved wheel consists in that, when operated under normal load, the forces applied on the tread which oppose a resistance to an increase of deflection due to an increase of load are composed of essentially of the said tensile radial forces toward the center; which forces are greater than the sum of the other forces, radial forces toward the ground forces due to pneumatic pressure, forces due to existing resistance of the tread to deformation.

When the load is transmitted to the wheel through a central part, one may conceive that the load is transmitted from the central part to the tread by means which are not the above mentioned means that are transmissive at tensile radial forces towards the center and which oppose a resistance to an increase of deflection. However, in fact, it is easier to provide a wheel where the same means exert two functions: (a) to transmit the load from the central part towards the tread (b) to oppose an increase of deflection due to an increase of said load. If the load is transmitted to the wheel through a part of the tread which is opposite to the ground, said means transmitting tensile radial forces exert only the second of the above function that simplifies the scheme.

The criteria for determining the relative strengths of the various forces that come into play vary according to the type of wheel.

A simple way to determine this is as follows: The wheel is fitted on a press which patterns are acting on two parts of the tread, one measures the force applied to the plattens and which generates the deflection (or the same length of contact patch) than the normal load applied on the central part, if the load is normally transmitted through a central part). Thereafter same measurement is made on same wheel in which the means transmitting tensile radial forces have been withdrawn, for instance by cutting the parts of the sidewalls which correspond to the part of the tread which are off contact with the plattens. The difference between these measurements shows the relative importance of the tensile radial forces acting against deflection. If the wheel comprises means for applying a pneumatic pressure, the influence of this pneumatic pressure may be previously determined by a similar process comprising measures on the inflated and deflated wheel.

If there is no resistance to deformation already existing in the tread, as is the case of an articulated or elements are hinged to each other end to end, and if these elements are attached to a central part by means of cords or blades having a low resistance to bending, it is obvious that the traction or tension forces in these cords are practically the only forces acting. If the tread is analysed separately, and if its stiffness (ratio of force/deformation) may be determined for instance by putting it between the plattens of a press which act along a diameter, the wheel complies to the above definition provided the stiffness of the tread is less than half the stiffness of the complete wheel whose sidewalls are submitted to traction stresses under normal conditions. If instead of cords there are provided continuous sidewalls resembling these of a tire, there must be added to the stiffness of the tread the stiffness of the part of the sidewall which is under compression. As will be seen, below, the parts of the sidewall which are under traction or tension and those which are under compression can have very different shapes, almost flat in the case of traction and very curved in the case of compression, which means they have very different ratios of force/deformation.

It is observed that in a wheel according to the invention the ratio of force/deformation of the sidewalls under tensile radial forces is necessarily high for a sufficient resistance to deflection. The length of the contact path depends on this ratio, the higher the ratio the shorter is the patch. In order to get longer patch, the invention provides to give an overlength to the means transmitting tensile radial forces. Overlength may be understood as the difference measured when the wheel is unloaded, between the length of said means transmitting radial forces and the radial difference of the extremeties of said means.

Without resorting to a destructive test, there is a simple test, which may be used, in the case of vehicle wheel constructed according to the technique of pneumatic tire, and providing a sufficient area in contact with the soil under normal load, which will make it possible to readily determine whether it falls within the scope of the present invention. If a graph of the deformation curve vs. the load is prepared in the case of a standard wheel it has substantially the appearance of a straight line going through the origin, whereas in the case of a wheel according to the present invention the curve is concave along the load axis; or forms two successive forces lines one of which has a high deformation vs. load ratio at low load, and the other has a lower deformation vs. load ratio near the normal load.

It can be broadly considered that, if at a load equal to half of the normal load, the deformation is definitely higher for instance 15% of half the deformation corresponding to this normal load, the wheel comes within the scope of the present invention, for the traditional techniques do not make it possible to obtain this phenomenon. Indeed, in the case of a standard tire, the curve of deformation vs. load is practically a straight line passing through the origin, and the same applies to the deformation curve of the reinforcing rings, such as those that have been heretofore proposed, and to the deformation curve of rigidified sidewalls. The sum of these linear functions cannot give a curve that is not straight.

A preferred version of the improved wheel comprises a rigid central part, means connecting the central part to the tread, a tread whose periphery is substantially constant which, when unloaded, automatically assumes the shape of a circle concentric with the central part and which opposes a resistance to any force tending to deform its convex shape, and which, when under the load applied to the wheel against a flat surface assumes shape composed of an arc greater than 180° and a flat portion in contact with the flat surface. This wheel, when under normal loading develops forces that keep the rigid part above the flat surface. These forces are made up essentially of the resultant of the radial tensile forces acting between the tread and the central part through the said connecting means. Alternatively to the cords the transmission means may be stiff rods radially slidable relative to the central portion but limited in its movement outwardly so that it is non-resistant to compressive but highly resistant to tensile strength.

The invention is explained more completely by referring to drawings where:

FIG. 17 is a perspective view of another wheel according to the present invention, partly fragmented;

FIG. 18 is a partial axial cross-section of the wheel of FIG. 17;

FIG. 19 to 23 are partial axial cross-sections of different embodiments of the wheel of FIG. 17;

A wheel in accordance with the present invention capable of functioning without internal pressure includes a central part, a radially deformable tread whose peripheral length is substantially constant surrounding the central part and radially spaced therefrom, and means for connecting the central part to the tread, such means having a first radial dimension when the unpressurized wheel is not loaded and has no internal pressure and a second radial dimension when the wheel is under the load it is intended to support and has no internal pressure and lies on flat ground, the second radial dimension being greater than the first radial dimension by no more than one tenth of the first radial dimension, and such means being substantially unable to generate an outwardly directed resilient force on a part of the tread in response to an inwardly directed displacement of said part of the tread rim from the position it has when the wheel is under the load it is intended to support, the connecting means including at least one ply containing cords which are rigidly connected to and extend between the central part and the tread and which are essentially untensioned and have a first length when the connecting means have said first radial dimension and which are tensioned and have a second length when said connecting means have a second radial dimension, the difference between the first and second lengths resulting in inwardly directed radial forces exerted by the connecting means on the tread, the ply having a curve whose axial radius r is greater than a limit relative to H, H being the radial distance between the central part and the tread when the wheel is unloaded and unpressurized, such limit being equal to 0.75 H, preferably 1.5 H under the condition when the ratio H/R equals 0.35 R, R being the radius of the wheel in the same condition, said limit being higher if said ratio is smaller.

Figure 4:
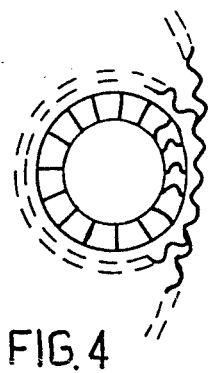
FIG. 4 is a cross-section of a wheel according to the present invention used as a "flexible cog-wheel"
Figure 5:
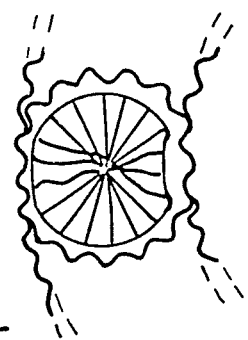
FIG. 5 is a cross-section of a wheel according to the invention used as a "flexible planet gear"
Figure 7:
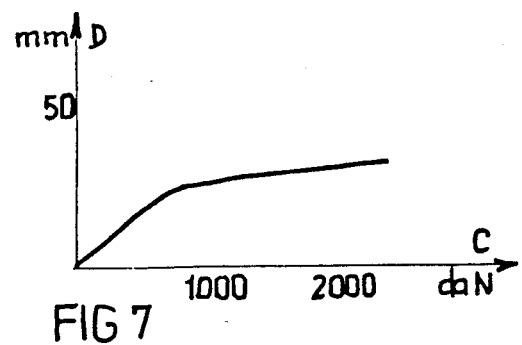
FIG. 7 is a graph of the deflection of the wheels of example 1.
Figure 9:
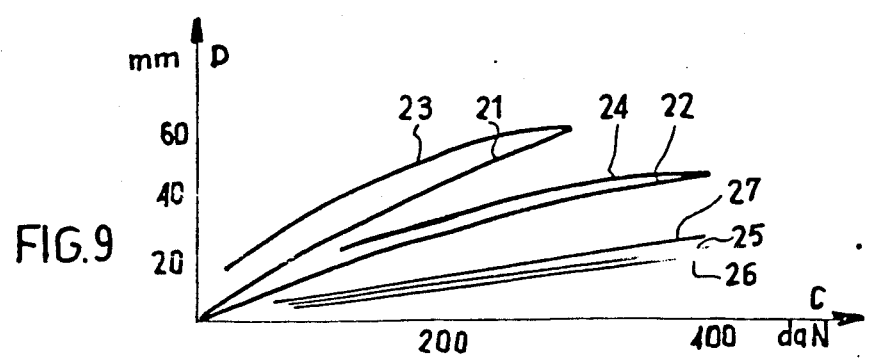
FIG. 9 is a graph of the deflection of the wheels of examples 2 and 3.

In FIGS. 7, 9 and 4, deflection D, represents the difference between the unloaded wheel radius and the height of its axis above the contact surface when the wheel is under load.

The wheel according to the present invention has a combination of properties as concerns the tread and the connecting means between the central part and the tread, which means will hereafter be designated by the word "sidewall" although in some cases they are not actually sidewalls in the conventional sense of the word.

The tread must be both radially deformable and yet have a substantially constant periphery. An extreme example of the tread coming within the above definition is the caterpillar, equipping some off-and-on-the road vehicles. Another extreme example in mechanical transmissions is a driving chain. The tread of diagonal ply tires do not come under the aforesaid definition because it has plies whose cables or cords extend diagonally and which can thus permit great variations in the periphery.

The tread of pneumatic tires of the belt type, especially those having radial carcasses, are made up of cord plies which form a small angle with the plane perpendicular to the wheel axis; this type of tread is close to the above definition, especially if they have steel cords. On the other hand the treads as described in the above identified French patent No. 1.376.590 are not deformable and therefore do not come within this definition.

As regards the sidewalls compared to the sidewalls of a standard tire regardless of the type of carcass the following should be noted: in the standard inflated tire, unloaded, the sidewalls have a cross section with the shape of the arc of a circle bulging outwardly and held in place along one edge by the rim and along the other edge by the tread: when loaded, these sidewalls are more curved near the part of the wheel which is in contact with the ground and less curved at the other part. If the tire is deflated when unloaded, its shape is about the same as described above; when loaded it collapses; in other words, near the part of the wheel in contact with the ground, the sidewalls are pinched between the rim and the tread, and at the other part of the wheel the sidewalls keep substantially the same shape as that of an arc, with limited change of its curvature.

It is evident that such a sidewall, itself, transmits only very little load between the rim and the tread in the absence of any pressure in the tire since such a load practically only corresponds to the resistance that it opposes to any deformation giving it the shape of a closed or almost closed curve, as mentioned above, in cross section.

Figure 1:
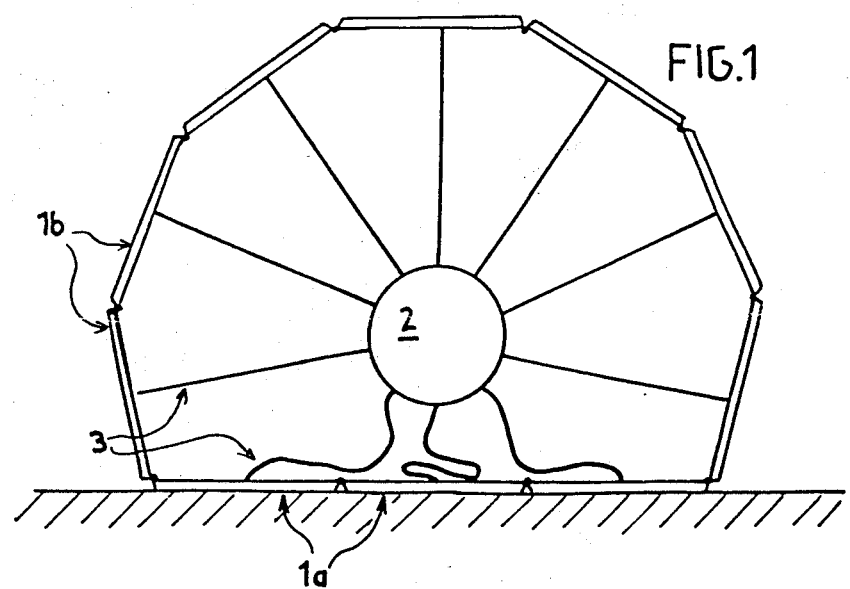
FIG. 1 is a simplified front view of a wheel according to the present invention.

In order to better illustrate the difference between such a sidewall and the one in accordance with the present invention, reference is made to FIG. 1., which shows the theoretical case of an articulated tread of the "caterpillar type", made up of a number of rigid elements 1 connected to a central part 2 by radial compression unresistant cords 3 of equal length. In order to provide a clearer illustration, an extremely small number of elements have been shown. Means, not represented here, prevent two elements from forming a concave angle toward the center and thus these elements always form a convex polygon. Under load some of the elements lay flat out against the ground, whereas other elements 1b are spread out in a circle whose radius is approximately equal to the cable or cord length plus the central part radius. There could also be elements, not represented, never very many, which are so located that they would be in transition between elements 1a and 1b. The cords corresponding to elements 1a are not under tension. The term cord is employed in its common sense is non-resistant to compressive forces but highly resistant to tension, for example rayon or nylon cords or steel cables.

It is evident that if the central part is not to come in contact with the tread, the relation between the periphery L of the tread and the length p of the cords must be kept within a certain range: if L/p is equal to $2\pi$ the cords would be under constant tension, the wheel will be rigid and the contact patch will be zero or almost reduced to the length of an element. If L/p is equal to $\pi+2$, the shape formed by the tread will be made of a half circle and one of its diameters, and the central part, even if its radius is zero, will touch the ground. Within the limits of this range the rolling axis will be a certain height above the ground. In this statement it is supposed that the central part has a zero radius.

In this hypothesis, the difference between the length of the cords and the radius of said half circle is about 18% of said length. In fact, the central part cannot have a zero radius, and it must always be at a certain height above the ground in order to permit variations of deflection, without bumping the tread. For those reasons, it is considered that the difference between the length of the cords and the radius of circular part of the tread of the loaded wheel minus the radius of the central part must be more than one tenth of said length for an effective run.

A wheel as shown in the sketch of FIG. 1 is possibly usable on a vehicle, however, in this case it would not be sufficiently comfortable; it would better be suited to a transmission system by providing gear teeth on the tread or by constructing it like a roller chain, a pinion is thus achieved that can transmit motion to a straight line or a curved gear or rack which is substituted for the ground. The advantage of this type of device is that it makes it possible to have a large number of teeth which enmesh at the same time at a reduced size.

If it is desired to use a wheel according to the principles of the present invention as a vehicle wheel, submitted to constant load variation, it should be constructed by somewhat modifying the very simple structure shown in the sketch in FIG. 1. With the wheel according to this sketch, when without load, it is circular and all the cords are substantially relaxed, it will not oppose appreciable resistance to a deflection with an increased load up to the point where it assumes the described shape, and, at this point, it will on the contrary oppose a very strong resistance corresponding to resistance to deformation which is that of elements 1b and to resistance to elongation of the corresponding cords 3.

For loads lower than the limit increase the resistance to deformation of the wheel for instance by replacing the cords which are perfectly flexible with elastic curved sidewalls and which are relatively gradually put under tension, or with cords having a modulus of elasticity which varies with the tension.

In the same manner, the caterpillar type articulated pad tread can be replaced by a continuous surface, for instance by sheet metal, which opposes a certain amount of elastic resistance to deformation, with the result that, in particular, the junctions between the flat portion and the circular portion is not made with a sharp angle but with more or less pronounced corners. On the other hand the tread may also be deformable crossways.

These changes have the effect of making the deflection curve or the curve representing the distance of the axis from the ground vs. the load no longer of two parts forming a right angle as in the case of FIG. 1 but rather much rounder in shape. The form of the curve is not the main thing; but rather it is the fact that when under a load the central part is suspended from the circular part of the tread instead of being supported by the flat part.

As a modification, in order to obtain a gradual variation in the resistance to deflection, there are provided an outer tube under a relatively low deflection, and an inner tube under a relatively low pressure, which on one hand provides to the sidewalls a certain curvature which becomes very small as the "load" increases, and on the other hand acts in such a way as to limit the deformability of the tread. However, it should be understood that the inner tube does not have the same function as in the standard tire; its only purpose is to change the deflection curve in proportion to the load since the wheel can be operated even if the inner tube pressure is equal to zero.

It should again be pointed out that the differences between the standard wheel and a wheel according to the present invention, that for a standard tire not under load, the cross section of the sidewalls assumes approximately the shape of an arc of a circle whose radius of curvature is r which usually falls between 0.6 H and 0.75 H where H is the height of the sidewalls, i.e. the distance measure along a line perpendicular to the wheel axis between the tread and the rim. The evolution of this arc of a circle configuration becoming a straight line configuration would correspond to putting the sidewalls under tension which corresponds to effecting an elongation of the sidewalls which would go to H+e where e, which represents the elongation of the sidewalls, is around 10% to 18% H.

It may also be pointed out that, if such a standard wheel is deflated under load, the rim comes to rest on the ground and, as in the case of FIG. 1, the tread takes on the form of a curve made up of a straight line and an arc of circle. If we call the radius of the unloaded wheel R, and the radius of the circular part of the deflated wheel R', and the angle at the center of the straight part 2P, the constance of the periphery of the tread is expressed by the equation: $R = R'(-P + \sin P)$; and the fact that the rim touches the ground is expressed by $R - H = R' \cos P$, H being the height of the unloaded sidewall.

Figure 2:
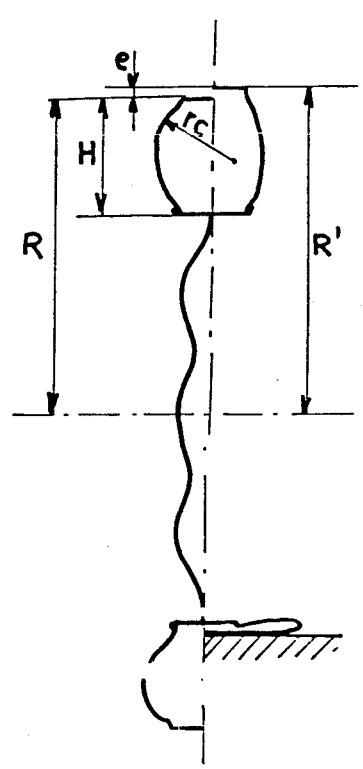
FIG. 2 is a cross-section of a wheel according to the prior art shown unloaded on the left side and deflated under load on the right side.

For a usual value of $R - H = 0.65 R$, the elongation of the radius $R' - R$ is substantially equal to 0.036 R i.e. $H \times 10.3\%$. If this elongation is compared to the elongation e which corresponds to putting the sidewall under tension, it is seen that in most cases the rim has touched the ground before the sidewall could be put under tension (see FIG. 2) and that in less unfavorable condition it just comes under tensions at the same moment that the rim touches the ground. There is no case in which the sidewall is able to keep the rim substantially above the ground by means of its tension. This means that there is no case where the sidewalls of conventional tires can be used in a wheel according to the present invention for connecting the central part to the tread.

It can be shown, by simple calculation, that with the above hypotheses if it is desired that, when loaded, the rim should be above the ground which is not less that half height H of the sidewall unloaded, the radius of curvature of the sidewall should no less than 1.5 H.

Practical calculations are much more complex and take into account particularly the compressibility of the tread around its periphery, the elongation of the sidewalls under tension and the flexibility of the tread in the axial plane. It should be noted, however, that, in a wheel according to the present invention a sidewall height H associated with the radius R of the unloaded wheel, at $R - H = 0.65 R$, the radius of curvature r of the sidewalls must be greater than 0.75 H and preferably greater than 1.5 H. When sidewall height H is less in relation to wheel radius R, the radius of curvature shall be greater with regard to H and vice-versa.

Figure 3:
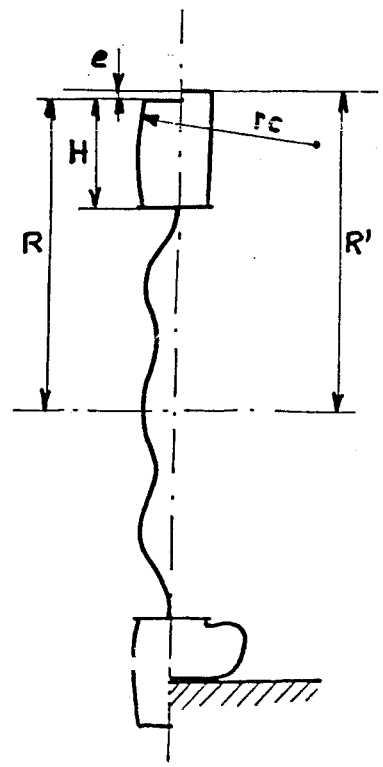
FIG. 3 is a cross-section similar to FIG. 2, showing an example of a wheel according to the present invention.

It can be seen that it is possible to produce a vehicle wheel according to the present invention, by using techniques similar to those in present use in the automotive or aeronautical industries, with the difference bearing mainly upon the following items: the wheel is similar to the conventional tire but with sidewalls that are almost flat or even completely flat if it is possible to speculate on there own elongation and the tread has a very high rigidity in the axial direction (which is parallel to that of the axis). Indeed, in FIG. 3, it can be seen that if the tread caves in under load, this causes the rim to lower toward the ground. The sidewalls should be locked into the rim in such a way as to transmit the traction or tensile forces which correspond to the load and moreover, the inner tube may be eliminated. Moreover, in accordance with the present invention and as described in examples hereinafter set forth, the side walls may comprise one or more plies of cords which extend essentially radially between and are connected to the wheel central part and tread, the ply or plies satisfying the dimensions and parameters set forth above.

A wheel according to the invention may be also produced by employing quite different techniques and, for instance, the articulated tread of the "caterpillar" type which is shown in FIG. 1 in which successive pad plates are mutually hinged may be constructed by various methods, especially as concerns the connecting means between the hinged tread and the central part, in order to obtain a relationship between the applied load and traction strains and deformation, in accordance with preselected laws. For instance each of the cords provided in FIG. 1 may be associated with a spring working in traction in the area wherein the cord is not under tension and a more powerful spring working in series with the cord itself. In FIG. 1 ten elements have been illustrated by way or simplification but this amount in practice is much greater, since the number of cords can also be different from the number of elements. Thus the flexibility of a tire wheel can attain the resistance and strength of an articulated rim wheel.

Another use for the wheel according to the present invention is for gears. If the tread is provided with teeth or other suitable means which may mesh with another wheel or a rack, a pinion may be obtained which has the feature (of FIG. 4) of having a number of teeth in mesh which is quite a bit greater than that of a standard pinion having the same volume. The "flexible pinion" according to the present invention may be geared with a standard pinion, even with several standard pinions at the same time. It also may be geared with one or more toothed racks, with one or more flexible pinions of the same type or with a chain. With respect to the standard pinion, it still has the advantage of affording larger number of meshed teeth, that makes it possible to transmit greater forces; up until now, this advantage has been obtained with chain-transmissions which usually require more space.

It can be seen that the flexible pinion may be constructed like the rubber equipped wheel of a vehicle since the teeth are obtained by means of profiles in the tread. A construction which is stronger is obtained by putting the teeth on the tread elements of the "caterpillar" type tread wheel. Another way is to attach the teeth directly to outside face of a tread made of a sheet metal or something similar. In some cases sufficient traction may be obtained without any teeth.

It is also possible to construct and apply a wheel according to the present invention without transmitting the load to the central part and even without providing a central part. The wheel (of FIG. 1) in this case has two areas bearing on outer surfaces, these being areas that are diametrically opposed. Between these areas the tread takes on a circular shape and if the sidewalls are composed of independent cords it is observed that they form diameters. It is also possible to want to use a greater number of bearing areas. If the tread surface has teeth, then this is referred to as a "flexible planet" if the surface is cylindrical, this is referred to as a "flexible roller".

In another type of application of the present invention, the tread which is not provided with teeth is geared in, with a belt which may be flat or has a V cross section, since the tread itself is either flat or forms grooves. Thus a "flexible pulley" is obtained, which has the feature of possessing an axis that may be moved about within large limits as compared to the belt, since the tension of the latter varies correspondingly. For the same size it has the advantage of producing a longer contact area between the belt and the flexible pulley. As compared to the pulleys with variable diameters which are used, for instance, in some gear boxes, there is a difference in that the ratio of belt speed does not vary for it is determined by the periphery of the tread.

The following examples of practicable variations should not in any way limit the scope of the present invention.

EXAMPLE 1

Figure 6:
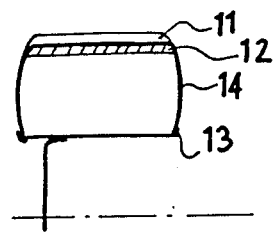
FIG. 6 is a half cross-section of the variation in example 1.

(FIG. 6 and 7)

A tread having outer unloaded diameter of 615 mm is formed or a rubber tread 11 and a portion 12 which is resistant to compression and has a thickness of 1.6 mm and is formed of sheet metal 225 mm wide. The central part 13 includes coaxial flanges with a diameter of 250 mm tightly bound together and spaced 225 mm apart. The sidewalls 14 are formed of a ply containing wire cords going through the tread surface between the rubber layer and sheet metal and connecting the flanges of the central part to which these ends are tightly fitted, like radial arcs; each cord locked between the flanges is 584 mm long. The outside diameter of the sheet metal is 605 mm.

It can be seen in FIG. 7 that the deflection curve comprises two angularly related straight portions.

The following measurements made on a reduced model of outside diameter 250 mm made it possible to graph curve of FIG. 7.

| deflection mm | 2 | 5 | 10 | 15 | 20 | 25 |
|---|---|---|---|---|---|---|
| load N | 20.4 | 62 | 177 | 355 | 590 | 754 |

EXAMPLE 2

Figure 8:
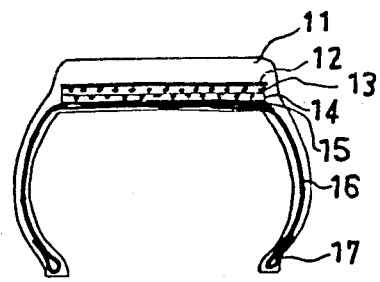
FIG. 8 is a half cross-section of the variation in example 2.
Figure 10:
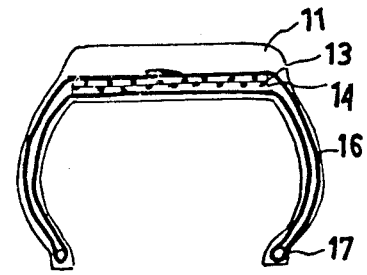
FIG. 10 is a half cross-section of the variation of example 3.

(FIG. 8, 9 and 10)

A tread having an outer diameter 600 mm when unloaded, is composed of a large rubber tread 11, and a portion which is resistant to compression 140 mm wide and which is made up of several plies containing steel cords parallel to each other embedded in rubber; relative to the plane containing the wheel axis, cords, in plies 12 and 15 form an angle of 0° and in plies 13 and 14 cross each other and form an angle of 82°. It should be noted that the variation 3 in FIG. 10 does not have plies 12 and 15. Sidewalls 16 are made up of a ply of radial cords embedded in rubber, which is turned up around wire cores 17 enclosing heads as in pneumatic tire, those having the function of the central part of the wheel. In variation 2 shown in FIG. 8 the cords are made up of rayon and are turned up slightly into the sidewalls after being wound around the beads, whereas in the variation 3 shown in FIG. 10, the cords are made up of steel, which are turned up into the sidewalls and their ends overlap ply 13 in the tread.

The average radius of curvature of the sidewalls is about 200 mm and they are 120 mm high. The wheels are equipped with a tire rim, on which a tight fit of the beads give a sufficient compactness between the wheel and the rim.

In FIG. 9 curves 21 and 22 represent respectively, for example 2 and 3, the deflection of the wheels without any inside pressure and curves 23 and 24 are those obtained when the load is decreased. The following measurements were used for graphing the curves of FIG. 9.

| deflection in mm | 10 | 20 | 30 | 40 | 50 | 60 | 70 |
|---|---|---|---|---|---|---|---|
| example 2 | | | | | | | |
| increasing loads in daN | 20 | 46 | 78 | 120 | 180 | 236 | 290 |
| decreasing loads in daN | | 15 | 44 | 64 | 88 | 130 | 215 |
| example 3 | | | | | | | |
| increasing loads in daN | 90 | 148 | 205 | 264 | 324 | 386 | |
| increasing loads in daN | | 90 | 128 | 190 | 225 | 350 | |

The curved shape is noted as well as a gradual reduction in slope and the amount of hysteresis which is represented by area between the curves 21 and 23 and between 22 and 24. These hysteresis corresponding to the energy stored during deflection are mainly due to the properties of the rubber of which the resistant portions of the treads are made; these properties are not counteracted by the action of a gas under pressure as is the case most often in a tire.

The curves 25 and 26 represent the deflection of the wheels in examples 2 and 3 which are inflated to a pressure of 1 bar: the straight shape of the deflection curve of the tire is again present and it should be noted that the resistance of deformation is greater than the resistance to deformation of a tire of the same size (590-13) inflated with 1.9 bar pressure which deflection is represented by curve 27.

A variation according to this type makes it possible to combine the advantages of a pneumatic tire and the inherent safety of the wheels according to the present invention; in addition, it is possible to build a structure which may store a great amount of energy. The variation in example 2 is a low pressure tire with, as a consequence, a less risk of bursting and which has the particular feature of being able to continue to be operated without any gas under pressure and this may be done without pinching the sidewalls between the rim and the tread. This variation is particularly suitable for automobiles and everything associated with the automotive.

The variation in example 3, in addition to the previous application is suitable for vehicles designed to be driven in soft soils and also for vehicles driven at high speeds on suitable highways and at the slow speeds of the roads; indeed, with a gas under pressure, the properties of the wheel are close to those of a pneumatic tire and, without gas under pressure you get a bigger contact patch. For combat vehicles an inner tube could be designed, which when there is no inflation pressure would fold up into the inside of the rim, and thus be protected from bullets.

EXAMPlE 4

Figure 11:
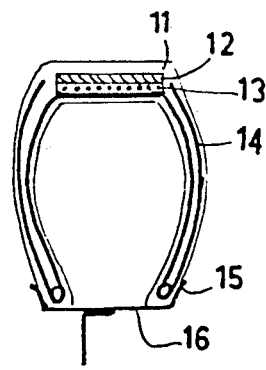
FIG. 11 is a half cross-section of the variation of example 4.
Figure 12:
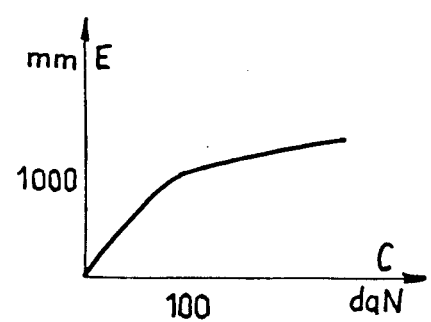
FIG. 12 is a graph of the length of surface patch under load of example 4.

(FIGS. 11 and 12)

A tread having an outer diameter of 1.500 mm unloaded, composed of a layer or rubber 11 and a resistant portion made up of rectangular small metallic plates 12.200×500 mm and a ply 13 of steel cords embedded in rubber, obtained by winding. The sidewalls (14) are composed of a ply of steel cords embedded in rubber which is turned around wire beads as in the pneumatic tire. Screws 15 going through the wire beads make it possible to attach them tightly to the rim 16 with a diameter of 500 mm. The radius of curvature of the sidewalls is 500 mm.

The curve in FIG. 12 represents the length of the contact patch vs the load applied to the wheel.

EXAMPLE 5

Figure 13:
FIG. 13 is a half cross-section of the variation of example 5.
Figure 14:
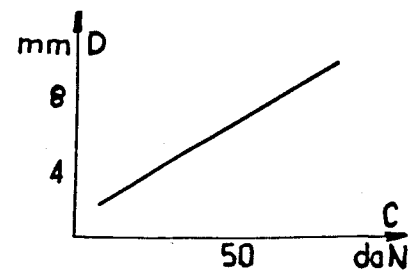
FIG. 14 is a representation of the length of surface patch under load, of example 5.

(FIGS. 13 and 14)

The tread having an outer diameter of 150 mm unloaded and a width of 20 mm and a thickness of 10 mm is made of a rubber compound 11 containing numerous fillers made up of large particles which give it a compression modulus of 20 daN/mm3. Sidewalls 12 connect the edges of the tread to the wheel center 13, located in the symmetry plane perpendicular to the wheel axis, and adhering to these elements.

The radial length of the sidewalls 12 is so calculated that, when the wheel is running under its normal load, the part of the sidewalls which corresponds to the part of the tread which is out of contact with the ground is always under radial tension. The value of this tension can oscillate relative to a middle value, but the normal amplitude of the oscillations always remains between the limits of a resilient tensile behaviour without a notable variation of the modulus of elasticity.

Each sidewall is made up of a rubber reinforced ply 2 mm thick having a strain modulus of 2 daN and the shape of a cone frustum. In FIG. 14 it can be seen that the deflection curve is a straight line which does not emanate from the origin.

Manufacturing this variation is quite simple and is well suited to applications when the loads are limited and can advantageously replace solid tires by adding the features of riding comfort and less in noise.

EXAMPLE 6

Figure 15:
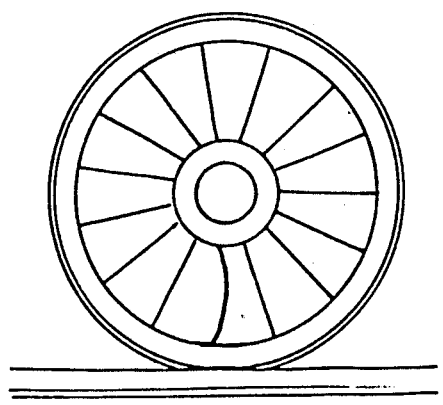
FIG. 15 is a side view of the variation of example 6.
Figure 16:
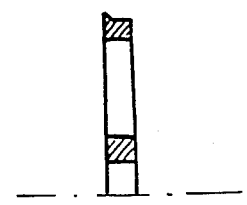
FIG. 16 is a half cross-section of the variation of example 6.

(FIGS. 15 and 16)

A steel tread is connected to a central part by means of steel blades 12 which all from radii, in planes comprising the axis, when the wheel is not loaded. When the tread is deformed there is a corresponding elongation of the blades 12 under tension and the other blades bend. The deflection of such a wheel is also close to a linear curve from a certain distance of the origin. The radial length of the steel blades 12 is so calculated that, when the wheel is running under its normal load, the part of the steel blades which corresponds to the part of the tread which is out of contact with the ground is always under radial tension. The value of this tension can oscillate relative to a middle value, but the normal amplitude of the oscillations always remains between the limits of a resilient tensile behaviour without a notable variation of the modulus of elasticity.

The length and section of the steel blades are so calculated that, under normal load, the blades of the upper part are always under tension and so that the blades of the upper part always remain in rectilinear even when the value of the load changes about its reference and the central part vertically oscillates during running, it is understood that those variations of loads or oscillations are inside usual limits. Calculations show that the force necessary in order to obtain an increase of distance between the two ends of a blade is very much greater when the movement is achieved by the lengthening of a straight blade than when it is achieved by a change of curvature of the bent blade. The ratio between those two forces is proportional to the square of r/e, e being the thickness of the blade and r its radius of curvature. Let us suppose that e=2 millimeter and r=1 meter in the lower part of the wheel: the tensile forces created in the upper part of wheel can be of an order 200,000 times higher than the compressive forces which develop in the lower part. When compared to a wheel according to the James U.S. Pat. No. 398,403, the wheel of the present invention could support much greater loads. Similar observation can be made as regards example 5.

This variation is particularly suitable for wheels which must support very heavy loads and to wheels which roll on guide wheels. A wheel according to the invention, compared a rigid wheel of the same size, has the advantage of improving riding comfort and of producing a contact patch which improves the adhesion of the wheel to its support.

EXAMPLE 7

This example relates to a wheel of the structure of that in Example 1 designed to have similar characteristics than 125 SR 12 tire. The tread made out of a spring metal sheet covered by a rubber rolling surface has same width and diameter than the tire. The two sidewalls are, each, composed of 600 radial nylon cords having 1 mm overlength.

The same deflection curve as the tire was obtained and it was observed that under the same load, with the same deflection the length of the contact patch was 25% longer. A rolling test run on a FIAT 500 vehicle shows driving characteristics similar to those of tires.

The following examples 8 to 13 illustrate another embodiment of the present invention in which the means connecting the tread to the central part of the wheel includes a pair of concentric rings on the tread and central part of respectively and a cable extending between and wound about the rings, preferably in the form of a tight spiral or helix.

Consequent to this structure, the cables no longer undergo an abrupt change of direction in tracing the outside of the tread, which is necessarily relatively thin, but they roll around the outside of a ring, which the transverses section presents, to the place where the cable traces it, a curvature that could be considerably better adapted. This ring transmits the tension of each cable on a certain peripheral length on the side of the band, and thus distributes the variations of contraints. On the other hand, the wheel's construction is considerably simplified. In effect: this one consists of three elements that can be mounted separately and assembled in the following manner: a cylindrical band which forms the tread and two distinctive sidewalls, in the form of an annular disc, each made up of two concentric rings, around which a layer of wire is wound. The preferred method for the assemblage of these elements between them consists of tying them with a mass of rubber which one cures following well-known techniques.

The wheel illustrated in FIGS. 17 and 18 includes a hub 31, made up of a half rim 33 fixed on a disc 32 and to which is removably screwed another half rim 34. The tread 35 is formed from a steel cylindrical thin band 36 covered on its external face by a rubber layer 37. The means of connection comprise a cable 38 rolled in spirals around a bead 39 and around a bead ring 40. The bead ring consists of a series of twisted steel cables covered with rubber and similar to the twisted bead ring of conventional tire. The tread-ring is made up of one piece of steel, having a radially flattened cross section.

In a practical example of the present structure as illustrated in FIG. 18, for a wheel of 500 mm diameter the cable 38 was formed of a polyamid of 1 mm diameter, the number of cable convolutions around the two side rings was 300. The tread ring had a section defined by segments of straight parallels connected by two semicircles. Its axial length was 25 mm and its radial thickness was 2 mm. The space between the outside face of the tread ring and the inside face of the cylindrical thin band had a thickness of 6 mm. The space was filled with a rubber mass 41. This has many functions: on the one hand, it interlocks the ring to the band 40 and the tread itself in a way to transmit to the latter the tensile forces that develop in the cables 38 when they are under tension. On the other hand, it immobilizes the cables and prevents them from shifting by connection to the tread ring 40. The cables are in contact with each other when they go around the bead-ring 39, but are not in contact when they go around the tread ring 40, because it has a greater peripheral length. They must, then, be maintained. On the other hand, the breaking of a cable in a single turn must not have an effect on the tension of other single turns, which implies that the cables cannot slide around the rings.

The rubber mass included between the rings and the tread also, functions to allow important radial deformability of the tread by shear and by the deformation at its free limits (it is well-known that the compressibility of the rubber is null). Cellular rubber more deformable, due to the increased compressability because of the included air, is also suitable. The form of the tread ring may be varied in accordance with the use for which the wheel is intended and also in view of other considerations, especially economic, one will prefer one form or another.

The simplest form and the least costly is that of a solid circular section (cf. FIG. 19) This form allows the attainment of wheels having a tread which can support lateral deformations On the other hand, its dimension, relatively large in the radial sense, is contra-indicated for wheels subjected to large deformations in this sense, for example, wheels with great footprints because of the excessive fatigue of the ring.

A form of tread ring of solid section but radially flattened as illustrated in FIG. 18, reduces the buckling suppleness in comparison with the above solid circular section ring. Besides, for a same cross-section area, it imposes on the wires a greater curvature, which increases the fatigue On the other hand, the fatigue of the ring at the time of the radial deformation is reduced. These properties well adapt this form to wheels less loaded than the preceding form, but with greater footprint and operating on a relatively regular ground.

FIGS. 22 and 23 illustrate other configurations in which the tread ring of toroidal form has a section which shows a large radius of curvature in the part in contact with the cables and a non-circular, flat, form (FIG. 22) or concave on the side which faces the bead (FIG. 23). One obtains in this manner interesting comprises as regards the stiffness, the inertia of the wheel, and the fatigue of the cables.

One can again utilize a tread ring formed by a plurality of independant rings 41, bound together by rubber (cf. FIG. 20). It is practically without mechanical consequence to replace many independent rings by an equal number of turns of unique cable or wire, a generally less costly solution. Such a ring permits greater deformations to equal fatigue than the rings earlier described. On the other hand, the presence of the rubber increases the hysteresis and the overheating at the tire of the rotation at great speed. This type of ring is suitable, therefore, mainly for wheels on vehicles rolling off the road at lower speeds.

Another type of ring is formed by a set of twisted cables 42, analogous to the bead rings of the conventional tires (cf. FIG. 21). This type permits for the same weight and resistance to fatigue, a larger diameter and a greater flexibility than a solid ring of circular section. The greater diameter allows the tensile stresses to be reduced in the sidewall cables, that makes this ring more adapted to wheels supporting heavy loads. The risk of wearing down by rubbing of the twisted cables can be reduced by the insertion of rubber, but at the price of an increase in the hysteresis and the overheating.

The junction between the rim and the tread ring poses certain problems. This part of the wheel is analogous to that of a conventional tire, in that the bead ring has the same twisted structure as a conventional tire, with a coating of rubber which immobilizes the cables and whose exterior form follows that of the rim. However, the weak radial lengthening of the sidewall can present difficulties assembling and disassembling in the traditional manner for the tires of passenger vehicles, and it is generally preferable to perceive a rim in parts assembled in a radial plane. On the other hand, the absence of internal pressure or the low value thereof means that there is no force urging the bead against the flange of the rim in the part of the wheel which is in contact with the ground. One can remedy this with the help of a bracing sleeve, well placed between the two beads. However, most often, the problem is resolved most easily in giving to the external face of the rim a conicity directed towards the plane of symmetry of the wheel. Indeed, as was explained above, the greatest tension of the sidewalls appears not in the upper part of the wheel, but proximate the radii which are in the neighbourhood of the contact point with the ground. This tension, due to the conicity of the rim, pulls the bead in the direction of the flange of the rim, and the stiffness of bead ring suffices to maintain the bead against the flange in the part which corresponds to the footprint.

Another solution to the problem consists in providing a small conicity to the sidewalls the gap between the two tread rings being larger than that between the two bead rings. The effect of the tension of the sidewalls has the same result as above. Of course, these different means can be combined. If one does not provide a bracing sleeve the same result is achieved, if, the bottom of each half-rim 33, 34 (FIG. 18) forms with the axle of the wheel an angle A greater than that which the means of connection makes with the plane of symmetry of the wheel. Thus, the tensioning of the means of connection, on the largest part of a periphery of the wheel, tends to move apart the means of connection from said plane of symmetry and to urge them against the edges 44 of the rim. As shown in FIG. 18, the external faces of the rim make an angle of about 7°, with the axle of the wheel, when the cables 38 are approximately parallel to the plane of symmetry but other arrangements are possible. The value of the difference between the two angles depends, among others on the coefficient of friction between the rim and the mass of the rubber 45 which forms the bead. Moreover, in those cases where one can totally avoid the deformability of the bead, thanks to the ability of the rim to be disassembled, one can use rigid rings for the beads.

As shown in the FIG. 18, on the right side, a flexible coat 45 including portions 46 is made of supple rubber, and includes the cables 38 on the outside of the wheel. This coat 46 is of a suppleness sufficient to permit the deformation of the cables 38, and its role is only to protect the interior of the wheel against the dust, gravel, or the like. The protective coat can also be independent of the cables, or, on the contrary, enclose them completely. Preferably, in the case of a protective coat, a blowhole is provided to avoid internal over-pressure. It would be advantageous to use rubber coated cables to assure for one part, a protection of the cables and for another part the best connection between the rings and the rubber masses 41 and 45.

The manufacturing of a wheel such as above described, consists normally of the following steps:
 fabrication of the rings 39 and 40 and of the thin band 46 and, the adhesion treatment on these elements;
 fabrication in a non-differenciated way of the left and right sidewalls by spirally coiling the cables 38 around the rings 39 and 40;
 the injection or transfer and the curing of rubber in the spaces 37, 41 and 45.

There may be provided a procedure of premolding the rubber to form parts 41 and 44 in order to immobilize the cables. The protective coat 46 may be obtained in the same molding operation, or can be fabricated separately, than glued onto elements 41 and 44.

The assemblage of the wheel comprises:
 the positioning of the assembly consisting of the tread to which the sidewalls are attached, onto the half-rim 33, fixed to the disc, the introduction of a bracing 43, and the mounting of the half rim 34, that locks the whole assembly. The changing of the aforesaid assembly if it is worn, is carred out in the reverse order of the assemblage.

EXAMPLE 13

Figure 24:
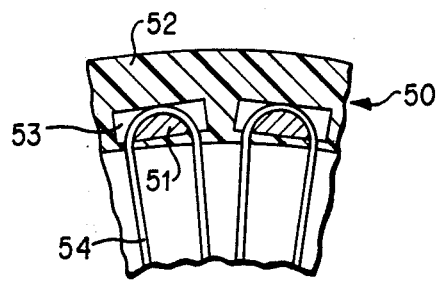
FIG. 24 is a partial radial cross-section of another wheel according to the present invention.

FIG. 24 is a partial cross-section of the tread portion of another wheel according to the invention, in a plane perpendicular to the axis of the wheel. The tread 50 comprises essentially a plurality of metallic bars 51, parallel to the wheel axis and rectangular in cross-section. The bars are embedded in a mass 52 of molded elastomer. The part of this mass which is between two adjacent sections constitute a hinged connection between successive and permits their relative pivotal movement within a limited angular range. At a small distance from their ends, the bars have a groove 53, which is of toroidal form, for receiving and retaining cables 54 which connect the tread to the central part. Each cable is fitted to the central part and forms an arc in a plane perpendicular to the axis of the wheel and turns over the bars 51 in groove 53.

EXAMPLE 14

Figure 26:
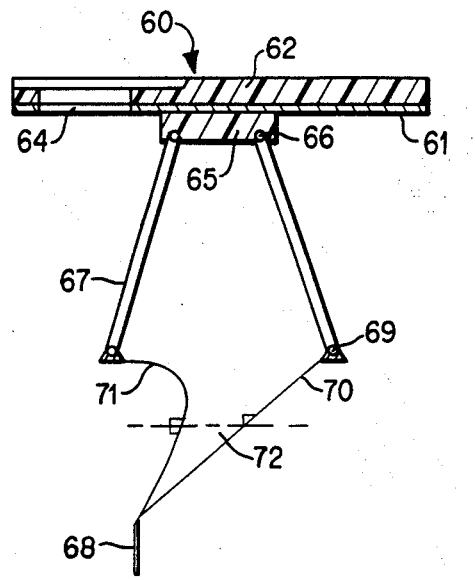
FIG. 26 is a cross-section taken along the line AA of FIG. 25.
Figure 25:
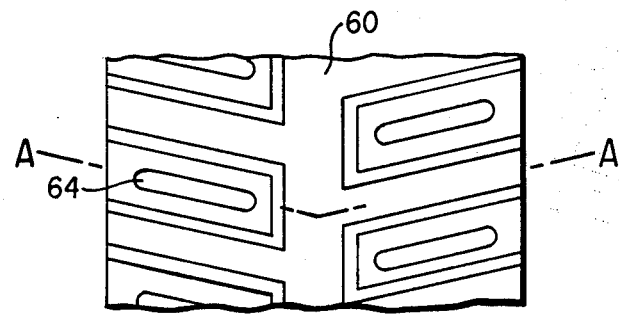
FIG. 25 is a partial front view of the tread of another wheel according to the present invention.

(FIG. 25-26) is another form of wheel according to the present invention and is specially intended to run on very muddy ground. The tread 60 is essentially formed of a band of steel 61 surrounded by a layer 62 of hard rubber. The steel band 61 and the layer of hard rubber have transverse through bores 64 which allow the mud to pass therethrough and improve the adherence of the wheel to the ground. To the inner peripheral face of the steel band 61, a central mass 65 of rubber is bound to said steel band, and two steel rings 66 are embedded therein. Cables 67 pass over said rings in the same manner as in examples 7 to 12, for connecting said tread to central part 68. The cables 66 also surround rings 69, bound to the central part. This central part comprises two deformable non-planar discs 70, 71, which carry the rings 69 at their peripheries. The discs 70, 71 are joined at their central portion but the distance between their peripheries can be modified by using axial screws 72 (only one is shown), whereby the tension of cables 66 can be varied. In FIG. 26, the through bores 64 are external relative to the cables 67. It is also possible to provide through bores in the middle part of the tread, between the two set of cables 67. While there have been described and illustrated preferred embodiments of the present invention, it is apparent that numerous alterations omissions and additions may be made without departing from the spirit thereof.

I claim:

1. A wheel capable of functioning without internal pressure, comprising:
 a central part;
 a radially deformable peripheral tread whose peripheral length is substantially constant surrounding said central part and radially spaced therefrom; and
 means for connecting said central part to said tread, said means having a first radial dimension when the unpressurized wheel is not loaded and has no internal pressure and a second radial dimension when the wheel is under the load it is intended to support and has no internal pressure and lies on flat ground, said second radial dimension being greater than said first radial dimension by no more than one tenth of said first radial dimension, and said means being substantially unable to generate an outwardly directed resilient force on a part of the tread in response to an inwardly directed displacement of said part of the tread rim from the position it has when said wheel is under said load it is intended to support, said connecting means including at least one ply containing cords which are rigidly connected to and extend between said central part and said tread and which are essentially untensioned and have a first length when said connecting means have said first radial dimension and which are tensioned and have a second length when said connecting means have said second radial dimension, the difference between said first and second lengths resulting in inwardly directed radial forces exerted by said connecting means on said tread, said ply having in a radial plane a curve whose axial radius r is greater than a limit relative to H, H being the radial distance between the central part and the tread when the wheel is unloaded and unpressurized, said limit being equal to 0.75 H under the condition when the ratio H/R equals 0.35 R, R being the radius of the wheel in the same condition, said limit being higher if said ratio is smaller.

2. A wheel according to claim 1, wherein said limit is 1.5 H.

3. A wheel according to claim 1, wherein said tread comprises rigid elements which can pivot relative to each other about longitudinal axes.

4. A wheel according to claim 3, wherein said ply comprises at least one cord fitted to a flange on said central part and forming radial arcs in a radial plane, said arcs passing over said rigid elements.

5. A wheel according to claim 1 wherein said ply comprises wire cords fitted to flanges located on the central part and forming radial arcs in an axial plane said arcs including a part of said tread.

6. A wheel according to claim 1 wherein said ply comprises at least one cable extending between and wound about corresponding parts of concentric rings on said central part and tread respectively.

* * * * *